United States Patent
Chapman et al.

[15] 3,647,492
[45] Mar. 7, 1972

[54] METHOD OF MAKING COLORED PIGMENTS HAVING PEARLESCENT QUALITIES

[72] Inventors: Douglas W. Chapman; Richard Dean Overley; Robert D. Rands, Jr.; Ronald S. Schreiber, all of 3600 North Second St., St. Louis, Mo. 63160

[22] Filed: Nov. 20, 1970

[21] Appl. No.: 91,585

Related U.S. Application Data

[63] Continuation-in-part of Ser. No. 15,887, Mar. 2, 1970.

[52] U.S. Cl...........................106/291, 106/300, 106/308 B, 106/308 F, 106/308 P
[51] Int. Cl........................................C08h 17/04, C09c 1/00
[58] Field of Search....................106/291, 300, 308 F, 308 P

[56] References Cited

UNITED STATES PATENTS

| | | | |
|---|---|---|---|
| 3,087,829 | 4/1963 | Linton | 106/291 |
| 3,453,131 | 7/1969 | Fadner | 106/308 F |

*Primary Examiner*—James E. Poer
*Attorney*—John D. Pope, III

[57] ABSTRACT

Pearlescent substrate may be modified with finely divided insoluble pigments by dispersing an adhesive binder substance in an aqueous suspension of the said substrate and pigment, effecting precipitation of the said binder, and recovering from the reaction mixture a modified, e.g., colored, product which substantially retains the pearlescent luster of the substrate. The product comprises the said substrate to which particles of the finely divided pigment are intimately bound by means of the binder. For example, the substrate may be a pearlescent bismuth oxychloride. The binder material may be selected from fatty acids or insoluble salts of fatty acids, silicic acid or insoluble salts of silicic acid, insoluble salts of alginic acid or suitable water-dispersible polymeric adhesives. Simple mixtures of the base with the pigment but without the binder of the present invention generally fail to exhibit the pearlescent qualities of the unpigmented substrate.

11 Claims, No Drawings

METHOD OF MAKING COLORED PIGMENTS HAVING PEARLESCENT QUALITIES

This application is a continuation-in-part of our copending application Ser. No. 15,887, filed Mar. 2, 1970.

BACKGROUND

Attractive white or colored pigments having a pearllike luster or sheen, especially those which are suitable for use in cosmetic formulations, are widely sought and used. Such pigments can be prepared by precipitating various insoluble compounds, such as colored metal oxides, on a pearlescent substrate such as nacreous bismuth oxychloride or mica platelets coated with a deposit of bismuth oxychloride. However the range of colors available in products of this kind is restricted because of the limited number of colored compounds which are suitable for deposition or precipitation in this manner.

Simple admixtures of pearlescent materials with colored pigments are less suitable because in the resulting mixtures the luster of the pearlescent material is largely obscured.

As used herein the term "pearlescent" refers to the soft, velvetlike luster characteristic of pearls rather than to their iridescent coloring. Any iridescence displayed by the nacreous substrate is usually masked by the color of the associated pigment.

Among the objects of the present invention therefore, are the provision of pearlescent pigments which can be prepared in a wide range of colors; the provision of pigments of the type indicated which are stable and retain both their color and pearlescent luster when incorporated into cosmetic compositions; and the provision of methods for preparing such pigments. Other objects and features will be in part apparent and in part pointed out hereinafter.

The invention accordingly comprises the products and methods hereinafter described, the scope of the invention being indicated in the following claims.

GENERAL SUMMARY

The invention is directed to cosmetically useful pigments having a pearllike luster which comprise a pearlescent substrate to which is intimately bound, by means of an adhesive binder, particles of a finely divided pigment which modifies the color, opacity or other characteristic of the pearlescent substrate.

The invention is also directed to methods for preparing modified pearlescent pigments by effecting precipitation of a water-dispersible adhesive binder substance and a finely divided insoluble pigment in an aqueous suspension of a pearlescent substrate on said suspended substrate, and thereafter separating the product from the aqueous medium.

DESCRIPTION OF THE PREFERRED EMBODIMENTS

A. The Pearlescent Substrate

While the present invention is applicable to coloring many water-insoluble pearlescent substances, including titanium dioxide-coated mica platelets, it is particularly useful and advantageous in conjunction with pearlescent bismuth oxychloride, either in the form of the pure material or as a deposit on mica flakes. Bismuth oxychloride is a somewhat sensitive compound which might easily be damaged by any harsh chemical treatment, such as those frequently required in order to form or precipitate a pigment in situ. In contrast, the conditions required for the method of the present invention are relatively mild as no vigorous chemical reactions are required, and there is therefore little possibility of harming even quite delicate substrates.

Particularly suitable for use in the present invention are the mica flakes coated with an epitaxial deposit of bismuth oxychloride disclosed in the copending application of Robert D. Rands, Jr. and Douglas W. Chapman, Ser. No. 766,614, filed Oct. 10, 1968.

B. The Modifying Pigment

The invention is generally applicable to coloring or otherwise modifying the aforementioned pearlescent substrates with finely divided insoluble pigments. Since the pigment itself does not undergo any chemical transformation, as for instance solubilization and reprecipitation, the method is applicable to a much wider range of pigments than using the methods known heretofore, and therefore the range of possible colors and color effects is also much broader and more varied.

C. The Adhesive Binder Substance

Numerous materials will serve as the adhesive binder substance. It may be either organic or inorganic. For example, it may be a fatty acid or an insoluble fatty acid salt of a multivalent metal such as aluminum, magnesium, calcium or the like. The fatty acid is preferably, though not necessarily, a saturated fatty acid containing 10 to 20 carbon atoms, such as lauric acid, stearic acid, palmitic acid and the like. Polymeric acids such as alginic acid and their insoluble salts are also useful. Alternatively the binder may be an inorganic compound, for example, a silicic acid salt of a multivalent metal such as those mentioned before. However, it is not essential for the binder to be an insoluble metal salt. It can also be a water-dispersible polymer which is coagulated in the presence of the suspended pigment and/or substrate, for example, a protein glue such as casein glue or a polymeric adhesive such as one of the commonly available polyvinyl acetate "white glues" such as the well-known "Elmer's Glue." While substances which are essentially colorless and odorless are preferred for cosmetic applications, binders possessing some color of their own may, when combined with certain pigments, produce interesting and attractive color effects.

D. Methods for Precipitating the Adhesive Binder

Precipitation of the adhesive binder substance in an aqueous suspension of the pearlescent substrate and the finely divided pigment to form the pigmented products of the invention may be accomplished in various ways. If a fatty acid or fatty acid salt is employed as the binder, a water-dispersible salt of the fatty acid, e.g., an alkali metal salt, may be added to an aqueous suspension of the substrate and pigment. An acid or solution of some appropriate multivalent metal salt is then added to precipitate the desired fatty acid or insoluble fatty acid salt. It appears that precipitation initially occurs on the surface of the pigment particles which subsequently unite with the substrate. In any event, when the solid constituents of the mixture are filtered off and dried, it is found that the pigment particles are firmly united to the substrate in such a manner that the pearlescent luster of the latter is substantially retained. Fusion of the substrate particles to each other is negligible and any agglomerates present in the dried pigment are readily broken up by light crushing or milling.

Silicic acid or alginic acid may be used as the binder in much the same way as the fatty acids.

Alternatively, the binder may be any of the natural or synthetic water-dispersible polymeric adhesives. The adhesive should preferably be substantially odorless and colorless. Thus ordinary hide glue is not usually satisfactory, but the colorless and odorless casein glue can be employed. The water-dispersed polyvinyl acetate "white glues" are usually preferred.

The following examples illustrate the invention.

EXAMPLE 1

| Mixture | Materials | |
|---|---|---|
| A | Ammonium stearate | 1 g. |
|   | Distilled water | 200 ml. |
|   | Red oxide (pigment grade) | 15 g. |
| B | $CaCl_2 \cdot 2H_2O$ | 0.25 g. |
|   | Water | 50 ml. |
| C | Coated mica substrate (10% BiOCl) | 100 g. |
|   | Water to make | 700 ml. |

The ammonium stearate and water are heated together. The red oxide pigment is added and dispersed using a Waring blender. This mixture is added to the stirred suspension of the pearlescent substrate in water. Solution B is added dropwise during ½ hour to the stirred mixture. The product is collected, washed with water and dried in a steam oven. The resulting product passes readily through a 60-mesh screen to yield a free-flowing red pearlescent powder.

EXAMPLE 2

Example 1 is repeated but the calcium chloride is replaced with 0.63 g. $FeSO_4 \cdot 7H_2O$. Similar results are secured and the resulting product passes readily through a 60-mesh screen to yield a free-flowing red pearlescent powder.

EXAMPLE 3

Example 1 is repeated but the calcium chloride is replaced by 1.1 g. $Al_2(SO_4)_3 \cdot 18H_2O$. Similar results are secured and the product passes readily through a 60-mesh screen to yield a free-flowing red pearlescent powder.

EXAMPLE 4

Example 1 is repeated but the calcium chloride is replaced by a 0.48 g. $ZnSO_4 \cdot 7H_2O$. The results secured are similar and the product passes readily through a 60-mesh screen to yield a free-flowing red pearlescent powder.

EXAMPLE 5

| Mixture | Materials | |
|---|---|---|
| A | Tallow acid No. 1 | 1 g. |
|   | 50% NaOH | 1 g. |
|   | Distilled water | 200 ml. |
|   | Red oxide (pigment grade) | 15 g. |
| B | Glacial acetic acid | 1 ml. |
|   | Water | 50 ml. |
| C | Coated mica substrate (10% BiOCL) | 100 g. |
|   | Water to make | 650 ml. |

The tallow acid and sodium hydroxide are heated together in 100 ml. of water to give a uniform dispersion. The red oxide plus the other 100 ml. of water are added and dispersed using a Waring blender.

This is added to stirred mixture C. Solution B is then added dropwise during ½ hour. The product is collected, washed with water, and dried in the steam oven. The dried product passes readily through a 60-mesh screen to yield a free-flowing red pearlescent powder.

EXAMPLE 6

Example 1 is repeated except that nacreous bismuth oxychloride replaces the bismuth oxychloride coated mica substrate. Similar results are secured.

EXAMPLE 7

Example 1 is repeated except that the red oxide is replaced with umber. The product resulting passed readily through a 60-mesh screen to yield a free-flowing brown pearlescent powder.

EXAMPLE 8

Example 1 is repeated but the red oxide is replaced with manganese violet. The resulting product passes readily through a 60-mesh screen to yield a free-flowing violet pearlescent powder.

EXAMPLE 9

Example 1 is repeated but the red oxide is replaced by 5 g. of carmine. The resulting product passes readily through a 60-mesh screen to yield a free-flowing magenta pearlescent powder.

EXAMPLE 10

Example 1 is repeated but the red oxide is replaced by fluorescent orange-red pigment (R-103-G-114, Radiant Color Co.). The resulting product passes readily through a 60-mesh screen to yield a free-flowing fluorescent orange-red pearlescent powder.

EXAMPLE 11

Example 1 is repeated by the red oxide is replaced with fluorescent green pigment (R-103-G-111, Radiant Color Co.). The resulting product passes readily through a 60-mesh screen to yield a free-flowing fluorescent green pearlescent powder.

EXAMPLE 12

Example 1 is repeated utilizing the following materials:

| Mixture | Materials | |
|---|---|---|
| A | Sodium stearate | 1.02 g. |
| Distilled water | | 200 ml. |
|   | FD&C Yellow No. 6, aluminum lake 40% | 5 g. |
| B | $CaCl_2 \cdot 2H_2O$ | 0.25 g. |
| Water | | 50 ml. |
| C | Nacreous BiOCl | 100 g. |
|   | Water | 400 ml. |

The resulting product passes readily through a 60-mesh screen to yield a free-flowing pale orange pearlescent powder.

EXAMPLE 13

Example 12 is repeated but the FD&C Yellow No. 6, aluminum lake 40 percent is replaced with FD&C Red No. 4, aluminum lake 36 percent pigment. The resulting product passes readily through a 60-mesh screen to yield a free-flowing pink pearlescent powder.

EXAMPLE 14

| Mixture | Materials | |
|---|---|---|
| A | Silicic acid | 2 g. |
|   | Water | 200 ml. |
|   | 50% NaOH | 20 g. |
|   | Chrome green hydrate (pigment) | 10 g. |
| B | $KAl(SO_4)_2 \cdot 12H_2O$ | 2 g. |
|   | Water | 100 ml. |
| C | Glacial acetic acid | 17 g. |
|   | Water | 100 ml. |
| D | Coated mica substrate (10% BiOCl) | 100 g. |
|   | Water to make | 500 ml. |

The first three components of A are combined to give a uniform colloidal mixture. The pigment is next added and dispersed with a Waring blender. This dispersion is added to stirred mixture D. During ½ hour solution B is added dropwise followed by a similar addition of solution C. The product is collected, washed with water, and dried in the steam oven.

The dry product is passed through a 60-mesh screen resulting in a free-flowing green pearlescent powder.

EXAMPLE 15

Example 14 is repeated but the chrome green hydrate is replaced with 10 g. of ultramarine blue. The resulting product passes readily through a 60-mesh screen to yield a free-flowing ultramarine blue pearlescent powder.

EXAMPLE 16

| Mixture | Materials | |
| --- | --- | --- |
| A | Sodium silicate solution (40°–42° Be; 8.7–9.0% NaOH; Na$_2$O: 3.36 SiO$_2$) | 40 g. |
| | Red oxide (pigment grade) | 10 g. |
| | Water | 100 ml. |
| B | Coated mica substrate (40% BiOCl) | 85 g. |
| | Water | 400 ml. |
| C | Glacial acetic acid | 7.5 ml. |
| | Water to make | 75 ml. |
| D | Al$_2$(SO$_4$)$_3$·18H$_2$O | 10 g. |
| | Water | 100 ml. |

The components of A are combined and dispersed with a Waring blender. This is poured into stirred slurry B. To this stirred mixture, C is added dropwise during ½ hour, followed by D during 1 hour.

The product is collected, washed with water, dried in the steam oven and passed through a 60-mesh screen. It is a free-flowing red pearlescent powder.

EXAMPLE 17

| Mixture | Materials | |
| --- | --- | --- |
| A | Red oxide (pigment grade) | 15 g. |
| | Water | 100 ml. |
| B | Coated mica substrate (10% BiOCl) | 85 g. |
| | Water | 240 ml. |
| C | AlCl$_3$·6H$_2$O | 10 g. |
| | Water | 100 ml. |
| D | Ammonium hydroxide, conc. | 10 ml. |
| | Water | 90 ml. |

The components of A are combined and dispersed with a Waring blender. This is poured into slurry B. Solution C is poured into the stirred mixture followed by solution D (ca. 95 ml. to pH 7–8) during ½ hour. The suspension is heated to 60° C. for 5 min., cooled, collected, washed with 250 ml. of water, and dried. The pearlescent product is passed through a 60-mesh screen. It is a free-flowing red pearlescent product.

EXAMPLE 18

| Mixture | Materials | |
| --- | --- | --- |
| A | Red oxide (pigment grade) | 15 g. |
| | Water | 200 ml. |
| B | Sodium alginate | 1 g. |
| | Glycerine | 3 ml. |
| | Water | 300 ml. |
| C | Coated mica substrate (10% BiOCl) | 85 g. |
| | Water | 140 ml. |
| D | CaCl$_2$·2H$_2$O | 2 g. |
| | Water | 50 ml. |

The sodium alginate is wetted with the glycerine, then dispersed in the water using a Waring blender. A is dispersed similarly. A, B, and C are combined and to this stirred mixture D is added during 1 hour. The product is collected, washed with 2×250 ml. of water and dried in the steam oven.

The red pearlescent product was passed through a 60-mesh screen.

EXAMPLE 19

Example 12 is repeated using the following materials:

| Mixture | Materials | |
| --- | --- | --- |
| A | Sodium stearate | 0.98 g. |
| | Distilled water | 200 ml. |
| | Red oxide (pigment grade) | 15 g. |
| B | MgCl$_2$·6H$_2$O | 0.66 g. |
| | Distilled Water | 50 ml. |
| C | Nacreous Bi OCl | 100 g. |
| | Water | 400 ml. |

The product resulting passed readily through a 60-mesh screen to yield a free-flowing red pearlescent powder.

EXAMPLE 20

| Mixture | Materials | |
| --- | --- | --- |
| A | Red oxide (pigment grade) | 15 g. |
| | Water | 200 ml. |
| B | Nacreous BiOCl | 100 g. |
| | Water | 400 ml. |
| C | White polyvinyl acetate glue | 2 g. |
| | Water | 100 ml. |

Mixture A is prepared using a Waring blender and added to slurry B. To this stirred mixture dispersion C is added dropwise in ½ hour. The product is collected, washed with water and dried in the steam oven. The material is passed through a 60-mesh screen to yield a red pearlescent powder.

EXAMPLE 21

| Mixture | Materials | |
| --- | --- | --- |
| A | Red oxide | 15 g. |
| | H$_2$O (distilled) | 100 ml. |
| B | Ammonium stearate | 1 g. |
| | H$_2$O (distilled) | 100 ml. |
| C | Mica coated with titanium dioxide ("pearl Afflair") | 100 g. |
| | H$_2$O (distilled) | 300 ml. |
| D | CaCl$_2$·2H$_2$O | 0.25 g. |
| | H$_2$O (distilled) | 100 ml. |

The ammonium stearate is dispersed in warm distilled water. B is combined with A and dispersed using a Waring blender. The combined dispersion (A and B) is then poured slowly into stirred slurry C. Solution D is added dropwise during ½ hour. The resultant product is collected, washed with 2×100 ml. of water, and dried in a steam oven.

The material was passed through a 60-mesh screen to yield a red pearlescent powder.

EXAMPLE 22

| Mixture | Materials | |
| --- | --- | --- |
| A | Titanium dioxide | 5 g. |
| | Water | 100 ml. |
| B | Coated mica substrate (40% Bi OCl) | 95 g. |
| | Water | 300 ml. |
| C | Sodium stearate | 1 g. |
| | Water | 100 ml. |
| D | Calcium chloride dihydrate | 0.25 g. |
| | Water | 50 ml. |
| E | 100% Polyoxyethylene (4) sorbitan monostearate (Tween 61, Atlas) | 1 g. |
| | Water | 100 ml. |

The components of B were mixed with an Osterizer mixer for ½ minute and then A and C were added. After 15 minutes solution D was added, followed 15 minutes later by dispersion E. The product was collected, dried in a steam cabinet and passed through a 60-mesh sieve. The pigment secured was a free-flowing white pearlescent powder having increased whiteness when compared to the coated mica substrate employed. It contained 5 percent titanium dioxide by weight.

EXAMPLE 23

Example 22 was repeated except that 85 g. of coated mica substrate were utilized instead of 95 g. and 15 g. titanium dioxide were used instead of 5 g. The product was a free-flowing white pearlescent powder containing 15 percent by weight titanium dioxide. It had increased whiteness compared to the product of example 22.

EXAMPLE 24

Example 22 was repeated except that 75 g. of coated mica substrate were utilized in lieu of 95 g. and 25 g. of titanium dioxide in lieu of 5 g. The product secured was a free-flowing white pearlescent powder containing 25 percent by weight titanium dioxide. It had increased whiteness compared to the product of example 23.

The proportions of pearlescent substrate and finely divided pigment may be varied within wide limits, depending in part upon the desired color effect and in part upon the hiding properties of the pigment employed. If too much pigment is employed, it will be evident to those skilled in the art that the pearlescent character of the substrate will be completely hidden. In that case the substrate would serve only as an inert carrier for the pigment, and the appearance of the resulting product would not differ essentially from that of the pigment itself. While the upper limit will vary somewhat depending upon the properties of the colored pigment, useful pearlescent products containing from about 0.5 percent to about 25 percent of pigment based on the weight of the substrate have been successfully prepared.

Similarly the proportion of adhesive binder should generally be no greater than necessary to adequately bond the pigment to the substrate. Again the optimum proportion will vary depending upon the character of the binder and pigments employed.

The pearlescent pigments of the present invention may be made with varied tints depending upon the pigment or pigments which are deposited on the pearlescent substrate. The foregoing examples are exemplary but compounds which may be deposited to secure other color effects will readily occur to those skilled in the art. Naturally when the resulting pigment is to be utilized in cosmetic products care should be taken that the deposited pigment or pigments are of low toxicity.

The pigments of the present invention not only exhibit excellent adherence of the pigment to the pearlescent substrate but desired optical effects can be obtained by proper selection of the colored pigment or pigments to be deposited on the pearlescent substrate. The optical effect can be varied in both shade and intensity according to plan as will be readily apparent to those skilled in the art.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A method for preparing modified pearlescent pigments which comprises preparing an aqueous suspension of an insoluble modifying pigment and a pearlescent substrate, dispersing an adhesive binder substance in the suspension, precipitating the binder in the presence of said suspended insoluble pigment and said pearlescent base, and separating from the resulting mixture the pearlescent substrate to which particles of the insoluble pigment are firmly bound by the said precipitated binder substance.

2. A method according to claim 1 wherein the adhesive binder substance is selected from the group consisting of fatty acids, silicic acid, alginic acid, and the water-insoluble salts thereof.

3. A method according to claim 1 wherein the precipitation of the adhesive binder substance is effected by dispersing in the aqueous suspension of the pearlescent substrate and the modifying pigment a soluble salt of an acid selected from the group consisting of fatty acids, alginic acid and silicic acid, and thereafter adding to the said suspension a reactant, selected from strong acids and soluble salts, which combines with the said acid to form an insoluble compound.

4. A method according to claim 1 wherein the adhesive binder substance is a water-dispersible adhesive polymer.

5. A method according to claim 1 wherein the pearlescent substrate is selected from nacreous bismuth oxychloride and mica platelets coated with an epitaxial deposit of bismuth oxychloride.

6. A colored pigment comprising a pearlescent substrate to which is intimately bound by means of an adhesive binder substance particles of a finely divided water-insoluble pigment of a selected color.

7. A pigment according to claim 6 wherein the said substrate is selected from nacreous bismuth oxychloride, mica platelets coated with an epitaxial deposit of bismuth oxychloride, and mica platelets coated with titanium dioxide.

8. A pigment according to claim 6 wherein the said water-insoluble pigment is bound to the said substrate by means of an adhesive binder substance selected from fatty acids, silicic acid, alginic acid, and the water-insoluble salts thereof.

9. A pigment according to claim 6 wherein the proportion of water-insoluble pigment to pearlescent substrate is just sufficient to impart the selected color.

10. A pigment according to claim 6 wherein the particles of water-insoluble pigment are bonded to the substrate by the binder without concealing the pearlescent luster of the substrate.

11. A pigment according to claim 6 wherein the substrate is mica coated with an epitaxial deposit of bismuth oxychloride and the water-insoluble pigment is titanium dioxide.

* * * * *

UNITED STATES PATENT OFFICE
CERTIFICATE OF CORRECTION

Patent No. 3,647,492  Dated March 7, 1972

Inventor(s) Douglas W. Chapman, Richard Dean Overley, Robert D. Rands, Jr. and Ronald S. Schreiber It is certified that error appears in the above-identified patent and that said Letters Patent are hereby corrected as shown below:

Column 2, line 39, "or solution" should read -- or a solution --. Column 3, line 41, "BiOCL" should read -- BiOCl --. Column 4, line 27, "Distilled water", which appears under the column headed "Mixture" should appear under the column headed "Materials"; line 31, "Water", which appears under the column headed "Mixture" should appear under the column headed "Materials". Column 6, line 6, "Bi OCL" should read -- BiOCl --; line 62, "Bi OCL" should read -- BiOCl --.

Signed and sealed this 15th day of August 1972.

(SEAL)
Attest:

EDWARD M. FLETCHER, JR.  ROBERT GOTTSCHALK
Attesting Officer  Commissioner of Patents

UNITED STATES PATENT OFFICE
CERTIFICATE OF CORRECTION

Patent No. 3,647,492                 Dated March 7, 1972

Inventor(s)   Douglas W. Chapman, et. al.

It is certified that error appears in the above-identified patent and that said Letters Patent are hereby corrected as shown below:

On the cover sheet, insert -- [73] Assignee: Mallinckrodt Chemical Works, St. Louis, Mo., a corporation of Missouri --

Signed and sealed this 26th day of December 1972.

(SEAL)
Attest:

EDWARD M. FLETCHER, JR.
Attesting Officer

ROBERT GOTTSCHALK
Commissioner of Patents